Patented Feb. 28, 1950

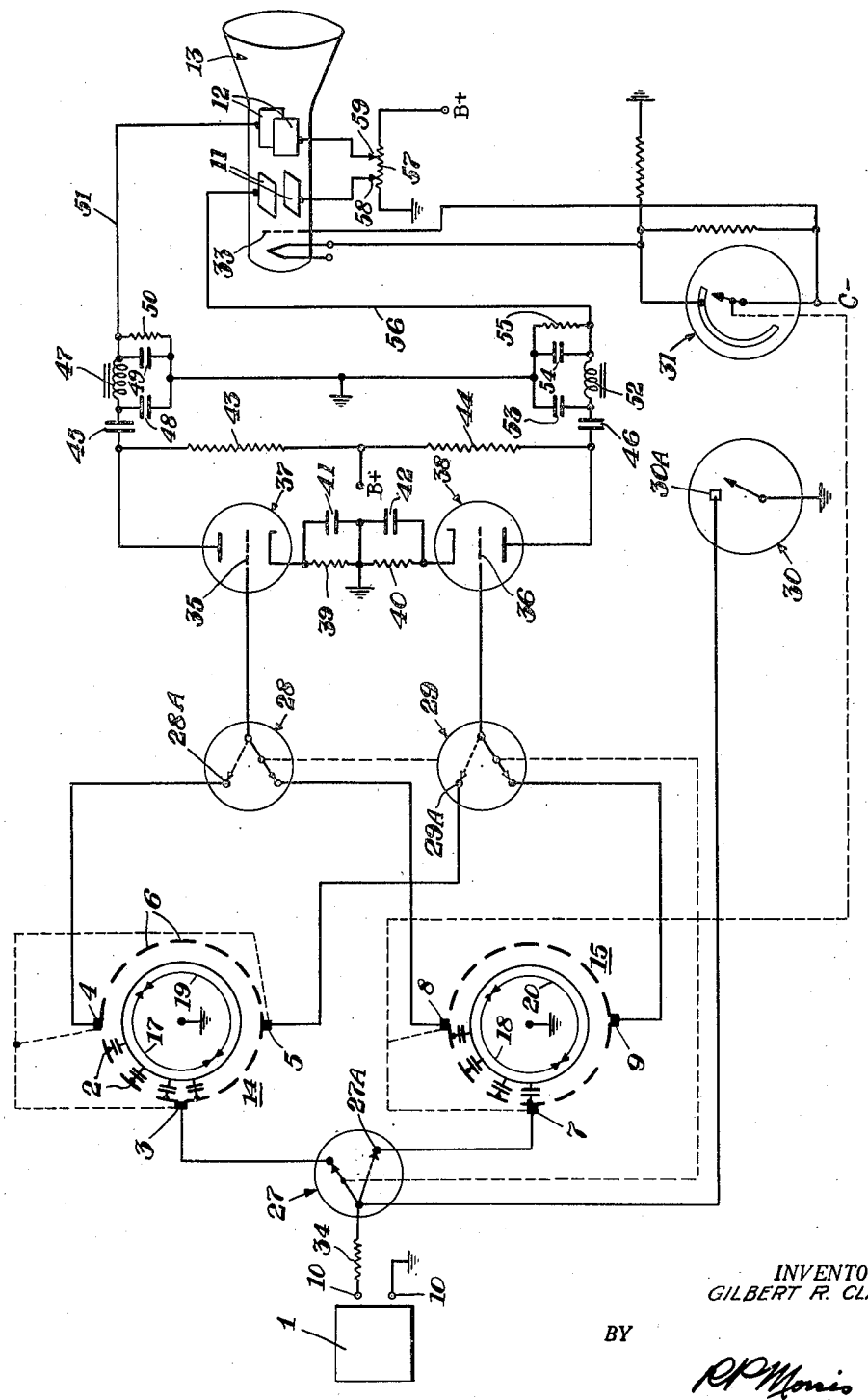

2,498,649

UNITED STATES PATENT OFFICE 2,498,649

TELAUTOGRAPH CONTROL SYSTEM

Gilbert R. Clark, Nutley, N. J., assignor to Federal Telephone and Radio Corporation, New York, N. Y., a corporation of Delaware Application January 24, 1946, Serial No. 643,100

10 Claims. (Cl. 178—18)

1

This invention relates to oscillograph reproducing systems and more especially to telautograph systems employing a cathode-ray tube oscilloscope reproducer.

A principal object of the invention is to provide an improved cathode-ray tube telautograph system.

Another object is to provide a telautograph system employing a cathode-ray tube oscilloscope reproducer, in conjunction with means for reducing the effects of interference on the teleautograph signals as reproduced on the cathode-ray tube.

A further object is to improve the operating characteristics of a telautograph system of the cathode-ray tube oscilloscope type, by subjecting the received telautograph coordinate signals to the action of a harmonic filter before applying the said signals to the deflecting elements of the cathode-ray tube.

A feature of the invention relates to a cathode-ray tube telautograph system, wherein the "X" and "Y" components of the original characters, are transmitted alternately in the form of a modulated radio frequency carrier, and a pair of harmonic filters are used at the receiver to control the simultaneous application of the "X" and "Y" signals to the respective horizontal and vertical deflection elements of a cathode-ray tube oscilloscope.

A further feature relates to a system for receiving alternately transmitted coordinate voltages such as may be produced by a telautograph transmitter, and the filtering of these voltages by a pair of harmonic filters each of which is connected through suitable switching arrangements effective alternately in storing the received coordinate voltages and releasing of the stored "X" and "Y" voltages simultaneously to the beam-deflecting elements of the cathode-ray tube oscilloscope.

Another feature relates to a cathode-ray tube oscilloscope which is controlled by coordinate voltages such as those produced by a telautograph transmitter, the said coordinate voltages being applied to a pair of harmonic filters each filter having its storage elements divided into two groups connectable simultaneously to the coordinate deflectors of the oscilloscope. The filters are alternately energized under control of the received coordinate signals and the cathode-ray tube luminescent spot is intermittently blanked off in timed coordination with the utilization of the energy in the storage elements of the filters in order that the coordinate signals are applied

2 correctly to the coordinate deflectors of the oscilloscope.

A still further feature relates to the novel organization, arrangement and relative interconnection of parts which cooperate to provide an improved telautograph system of the cathode-ray tube oscilloscope type.

Other features and advantages not particularly enumerated will be apparent after a consideration of the following detailed descriptions and the appended claims.

Two separate rectified signals representing the "X" and "Y" components of the original scanned subject matter are received alternately and recurrently at the terminals 10. These signals may be produced by any well-known form of telautograph transmitter indicated diagrammatically by block 1. These signals which are referred to as "X" and "Y" signals are transmitted to the receiving terminals 10—10 after demodulation and rectification, and are arranged to be simultaneously applied to the coordinate deflection control plates or elements 11 and 12 respectively of cathode-ray tube oscilloscope 13. The simultaneous application of the alternately received signals to the deflector plates of the cathode-ray tube is effected through the intermediary of two rotatable harmonic filters 14 and 15, whose rotatable elements are synchronized and may be mounted on the same shaft which is driven by any suitable motive means, for example at the rate of 1800 R. P. M. For a detailed description of these harmonic filters, reference may be had to abandoned application Serial No. 591,894, filed May 4, 1945, the disclosure of which is incorporated herein by reference. As disclosed in said application, each filter comprises a bank of separate storage elements 2, which may be either electrostatic or electrodynamic, together with means such as commutator brush 3 for charging these elements recurrently and cyclically in a predetermined order under control of the received rectified signals. Inasmuch as the received signals, after rectification, have regular frequency components corresponding to the frequency of recurrence of the "X" and "Y" signals combination and harmonics thereof, the rate of rotation of the charging brush 3, should correspond to the said frequency of recurrence. The energy of each incremental segment of the rectified wave form is impressed on a particular storage element. Since the storage is at a cyclical rate, the repeated wave form will build up energy in the various storage means, provided the repetition rate of the received wave corresponds with the cyclical rate of rotation of the brush 3. However, undesired interference noises which do not occur at the repetition rate of the received wave will not build up during the storage cycles. Since only the desired signals on the recurring received waves will cumulatively charge the storage elements, these filters are of a "harmonic" or "synchronous" type and the outputs therefrom of interfering signals will be negligible in comparison with the outputs of the harmonically or synchronously selected waves. The energy stored in condensers 2 is applied by a pair of brushes 4, 5 to amplifier tubes 37, 38 without appreciable loss of energy from condensers 2. These brushes may be mechanically coupled so as to rotate as a unit around, and at the same time making contact with, the respective commutator segments 6 to which the several storage condensers are individually connected. Alternatively, the brushes 3, 4 and 5, may be stationary and the commutator segments and condensers may be mounted on a suitable rotatable drum. Preferably, the brushes 4 and 5 are displaced apart 180° while the brush 3 may be located substantially mid-way between brushes 4—5 around the circumference of the commutator. The filter 15 is similar to filter 14 and has brushes 7, 8 and 9, which correspond to the similar brushes 3, 4 and 5 of filter 14.

The simultaneous application of signals to the vertical and horizontal deflection plates 11 and 12 of the cathode-ray tube 13, results in a visual display of the signals on the luminescent screen of the tube. In order to compensate for the relatively short persistence of the phosphorescent screen of tube 13, each harmonic filter alternately serves the function of building-up the wave forms for a period of one character time interval, and then supplying these wave forms recurrently to the cathode-ray tube for one character time interval. In other words, while the "X" and "Y" telautograph signals are repeated alternately in the transmission to terminals 10, they are picked-up simultaneously from the harmonic filters by the brushes 4—5, or by the brushes 8—9, and are applied simultaneously to the cathode-ray tube. The storage elements of each of the harmonic filters which are associated respectively with each of the received "X" and "Y" signals are arranged substantially around one-half the circumference of the harmonic filters. Hence the storage elements along the sectors 17 and 18 of filters 14 and 15 respectively supply the signals which are applied to the horizontal deflection plate 12; and the storage elements along the segments 19 and 20 of filters 14 and 15 respectively supply the signals which are applied to the vertical deflection plate 11. The received rectified "X" and "Y" signals are supplied for complete character time intervals as determined by switch 27 alternately to the harmonic filter 14 and 15, and the stored signals are likewise utilized alternately for equal time intervals under control of switches 28 and 29. The storage elements of the harmonic filters 14 and 15 alternately deliver energy to their associated circuits for the time of character intervals and store energy received from the rectified audio signals during the interleaving character time intervals.

The timed charging and discharging functions of the "X" and "Y" sections of the two filters are controlled by three switches 27, 28 and 29. These switches are suitably ganged together so as to alternate their respective movable contact arms from one to the other of the associated fixed contacts at a predetermined rate, corresponding to the character time intervals. In order to make sure that the charges on the respective condensers of the filters corresponding to a preceding displayed character are properly wiped-off before beginning the storage of the signals corresponding to a succeeding character, there is provided a switch 30 which has its rotatable or movable contact arm directly grounded and is adapted to ground its associated contact 30A for a predetermined short time interval having a minimum duration corresponding to one complete revolution of the harmonic filter.

During the display of a character on tube 13, the control grid 33 is intermittently supplied with cut-off negative bias, and for this purpose there is provided an additional switch 31 which is suitably ganged to the brushes of the harmonic filters so as to apply this cut-off bias during one-half revolutions of either filter, thus making sure that the "X" and "Y" signal potentials are never applied to the incorrect set of deflector plates of tube 13.

The resistor 34 through which the rectified audio signals are conveyed to switch 27 and thence to filters 14 and 15 is so selected that condensers 2 cannot charge appreciably until many revolutions of the harmonic filter, corresponding to a character time interval. This cumulative charging causes the harmonic filters to have a waveform selectivity, as may be understood by reference to application Serial No. 591,894. By this means the effect of interference can be greatly reduced. The separate rectified audio signals received at terminals 10, flow through switch 27 and through input brushes 3 or 7 to the harmonic filters 14 or 15. The signals leave the harmonic filters via output brushes 4, 5, 8 and 9, and pass through switches 28 and 29 to the grids 35 and 36 of amplifier tubes 37 and 38. The signal to be applied to the horizontal deflection plates 12 is fed to the control grid 35 of amplifier tube 37 and the signal to be applied to the vertical deflection plates 11 is fed to the control grid 36 of tube 38. The tubes 37 and 38 are identical as are the respective circuits associated with them. In these two amplifier circuits the following components are of equal value; resistors 39 and 40, by-pass condensers 41 and 42, plate load resistors 43 and 44, and blocking condensers 45 and 46.

The signals to be applied to the horizontal deflection plates 12 are passed through the low-pass LCR filter associated with amplifier tube 37 which consists of low frequency inductor 47, condensers 48 and 49, and resistor 50. This filter network eliminates the unwanted ripple arising from the commutation of segments 6 and allows the remaining wanted signals to be applied to the horizontal deflection plate 12 of cathode-ray tube 13 through lead 51.

The signals to be applied to the vertical deflection plates 11 are passed through the low-pass LCR filter associated with amplifier tube 38 which consists of low frequency inductor 52, condensers 53 and 54, and resistor 55. Like the filter associated with amplifier tube 37, this filter network eliminates the unwanted segment ripple which may be present in its input and allows the remaining wanted signal to be applied to the vertical deflection plates 11 of cathode-ray tube 13 through conductor 56. The low-pass filter networks associated with tubes 37 and 38 may be of any other well-known design.

The resistor 57 connected between ground and a high positive voltage supply acts as a voltage divider. The proper setting of the adjustable contacts 58 and 59 along resistor 57 provides the appropriate centering voltages for the horizontal and vertical deflection plates of the cathode-ray tube 13 as is well-known in the art.

The operation of the apparatus with relation to the various switches and the harmonic filters may be easily understood by attention to the following explanation. With the switches in the position shown, the "X" and "Y" signals received at terminals 10 are successively stored in the storage element banks 17 and 19 of the filter 14. The brushes 4 and 5 which transfer the signals to be applied to the horizontal and vertical deflection plates respectively are connected to the open terminals 28a and 29a of switches 28 and 29, and therefore no energy is fed to the remaining circuits. When the reception of another character is about to occur, the synchronizing means controlling the movement of switches 27, 28 and 29, simultaneously changes them from their full-line position to the dotted-line position completing circuits through terminals 27a, 28a and 29a. The instant this change is completed, the signal to be applied to the horizontal deflection plates 12 is fed from brush 4 through switch 28 to the grid 35 of amplifier tube 37. At the same instant the signal to be applied to the vertical deflection plates 11 is fed from brush 5 through switch 29 to grid 36 of amplifier tube 38. These signals then pass simultaneously through the remaining circuit as previously described and cause the luminescent spot of the cathode-ray tube to follow a trace corresponding to the relative magnitudes of the original "X" and "Y" signals.

While the signals from harmonic filter 14 are being passed to the tube 13, the signals received at terminals 10 are fed into the harmonic filter 15 through input brush 7. Output brushes 8 and 9 are open-circuited and the energy is stored in the storage elements of the harmonic filter 15. When this second character is completed the switches 27, 28 and 29 are automatically returned to the full-line position and the signals to be applied to the horizontal deflection plates 12 of the tube 13 are fed to grid 35 of amplifier tube 37 through brush 8 and switch 28. The signals for the vertical deflection plates 11 of the tube 13 are simultaneously fed to the grid 36 of amplifier tube 38 through brush 9 and switch 29. These signals are then displayed on the cathode-ray tube 13 in a manner similar to that mentioned for the first character.

In the embodiment as described, the switches 27, 28 and 29 alternate once each character and the switch 30 is closed for one complete filter shaft revolution at the beginning of each separate operation representing a new character and thereby all of the storage elements associated with the filters are preliminarily discharged directly to ground at switch 30. The cut-off voltage applied to switch 31 is applied intermittently to the control grid 33 of tube 13 during the entire character display operation so as to render tube 13 inoperative while brush 4 (or 8) is picking up the "Y" signal and brush 5 (or 9) is picking up the "X" signal, and to render tube 13 operative while brush 4 (or 8) is picking up the "X" signal and brush 5 (or 9) is picking up the "Y" signal.

What is claimed is:

1. In a visual signal reproducing system of the kind adapted to alternately receive two sets of signals over a single channel representing respectively the spacial coordinates of a moving point to be reproduced, a cathode-ray tube oscilloscope having coordinate beam-deflecting elements, a bank of electric energy storage elements, means to alternately charge each of said elements under control respectively of said separate sets of signals so that the stored energy in each element represents a corresponding incremental segment of the wave form of said signals, a pair of channels leading from said bank respectively to each of said coordinate deflecting elements, and means simultaneously to discharge said stored energy in pairs of storage elements over said respective channels.

2. A visual signal reproducing system according to claim 1 in which said sets of signals have a regular recurrent-frequency component and the product of the number of storage elements in said bank and the cyclical rate of charging thereof bears an integral relation to the said regular frequency component of said signals.

3. A visual signal reproducing system according to claim 1 in which said bank is in the form of a harmonic filter having means to charge said storage elements at a predetermined cyclical rate synchronized on said signal wave, means to discharge said storage elements, and means to introduce a predetermined time lag between the charge and discharge of each of said elements corresponding to any of said incremental segments.

4. A visual signal reproducing system according to claim 1 in which said storage elements are in the form of condensers, said condensers being provided with a charging brush and a pair of discharge brushes, all the brushes being rotated in unison, one discharging brush being connected to control the horizontal deflection of the oscilloscope, and the other discharging brush being connected to control the vertical deflection of the oscilloscope.

5. In a visual signal reproducing system of the kind adapted to receive two sets of signals representing respectively the spacial coordinates of a moving point to be reproduced, a cathode-ray tube oscilloscope having coordinate beam-deflecting elements, a pair of harmonic filter and energy storage devices, each device comprising a bank of condensers, means to receive said sets of signals in alternate periodic time sequence, means to apply said signals alternately for equal time periods to said devices, first and second discharge brushes for each device, means connecting the first discharge brush of one device to one of the deflecting systems of the oscilloscope and for simultaneously connecting the second discharge brush of the other device to the other deflecting system of the oscilloscope, and switch means operated in timed relation with respect to the rate of cyclical charging of said condensers for connecting the said second brush of the first device to said one deflecting system of the oscilloscope and simultaneously connecting the said first discharge brush of the other device to said other deflection system of the oscilloscope.

6. A system according to claim 5 in which said switch means comprises a pair of switches, each switch having a first and a second contact, the first and second contacts of one switch being connected respectively to the said first discharge brushes of both said devices, and the first and second contacts of the other switch being connected respectively to the second discharge brushes of both said devices, and each switch having a movable contact for alternately connecting its associated first and second contacts in circuit with the corresponding deflection system of the oscilloscope.

7. A system according to claim 5, in which a third switch is provided for controlling the alternate application of the received sets of signals to said devices.

8. In a telautograph system, a cathode-ray tube oscilloscope reproducer, means to alternately receive two voltages over a single channel representing the "X" and "Y" coordinates of each point of the telautograph image to be reproduced, a pair of synchronous filters, means to alternately apply the received signals to said filters in alternate periodic sequence so that each filter builds up the received wave forms for a predetermined time interval, each of said filters having a pair of spacially displaced discharge brushes corresponding respectively to the "X" and "Y" coordinates of the received telautograph signals, and means for applying said wave forms from each of said filters to a corresponding deflection system of said oscilloscope, said last-named means connecting only the "X" discharge brush of one filter to one of the oscilloscope deflection systems while only the "Y" component discharge brush of the other filter is connected to the other deflection system of the oscilloscope.

9. In a telautograph system, means to receive in alternate time periodic sequence "X" and "Y" spacial components of a telautograph message, a cathode-ray tube oscilloscope having coordinate beam-deflecting systems, a pair of harmonic filters, a cyclically operating switch for applying the received "X" and "Y" signals to said filters alternately, a pair of discharge brushes for each filter for controlling respectively the tube deflection systems of said oscilloscope, means to apply a wiping-out potential at a regularly recurrent interval to each of said filters, and means synchronously applying to said oscilloscope a fluorescent spot blanking potential.

10. In visual indication apparatus including a cathode-ray tube, electrical switching means for conveying alternately received periodic signals to a synchronized rotatable harmonic filter, a second harmonic filter cooperating with said first harmonic filter and said switching means, each filter having a bank of electrical storage means, discharge brushes and electrical switching means associated with the output of said harmonic filters, a push-pull amplifier controlled by said filters, low-pass filter means electrically connected to said push-pull amplifiers for suppressing the ripple noise arising at said filters, and means simultaneously connecting said low-pass filter means to the respective vertical and horizontal deflection elements of said cathode-ray tubes.

GILBERT R. CLARK.

REFERENCES CITED

The following references are of record in the file of this patent:

UNITED STATES PATENTS

| Number | Name | Date |
| --- | --- | --- |
| 2,168,049 | Skellett | Aug. 1, 1939 |
| 2,178,471 | De Bruin | Oct. 31, 1939 |
| 2,261,309 | Stuart, Jr. | Nov. 4, 1941 |
| 2,349,437 | Keller | May 23, 1944 |
| 2,409,559 | Haight | Oct. 15, 1946 |
| 2,409,560 | Haight | Oct. 15, 1946 |